United States Patent [19]

Garner

[11] 4,210,270
[45] Jul. 1, 1980

[54] ELECTRONIC MONITORING OF ROCK BIT PARAMETERS

[75] Inventor: Lloyd L. Garner, San Clemente, Calif.

[73] Assignee: Smith International, Inc., Newport Beach, Calif.

[21] Appl. No.: 953,738

[22] Filed: Oct. 23, 1978

[51] Int. Cl.$^2$ .................................... B23K 37/04
[52] U.S. Cl. ................................ 228/103; 228/9; 219/121 EM; 33/178 E; 29/407
[58] Field of Search ............. 228/103, 102, 182, 9, 228/10; 219/121 EB, 121 EM; 33/178 R, 178 B, 178 E; 29/407; 324/207, 243

[56] References Cited

U.S. PATENT DOCUMENTS

| | | | |
|---|---|---|---|
| 2,805,677 | 9/1957 | Baird | 324/207 |
| 3,392,829 | 7/1968 | Keinanen | 324/243 |
| 3,732,608 | 5/1973 | Knopf | 29/407 |
| 3,837,198 | 9/1974 | Higgins | 29/407 X |
| 3,907,191 | 9/1975 | Lichte | 228/182 |
| 4,054,772 | 10/1977 | Lichte | 219/121 EM |
| 4,098,448 | 7/1978 | Sciaky et al. | 228/102 |

*Primary Examiner*—Francis S. Husar
*Assistant Examiner*—K. J. Ramsey
*Attorney, Agent, or Firm*—Robert G. Upton

[57] ABSTRACT

A method and apparatus is disclosed for monitoring the parameters of a rock bit which utilizes electronic sensing principles. The use of these sensing devices will provide continuous measurement of the rock bit through remote monitoring equipment. The sensing devices monitor the rock bit parameters during the electron beam welding process to assure that both the height and the gage of the rock bit remains within set tolerances while the welding process is taking place.

17 Claims, 4 Drawing Figures

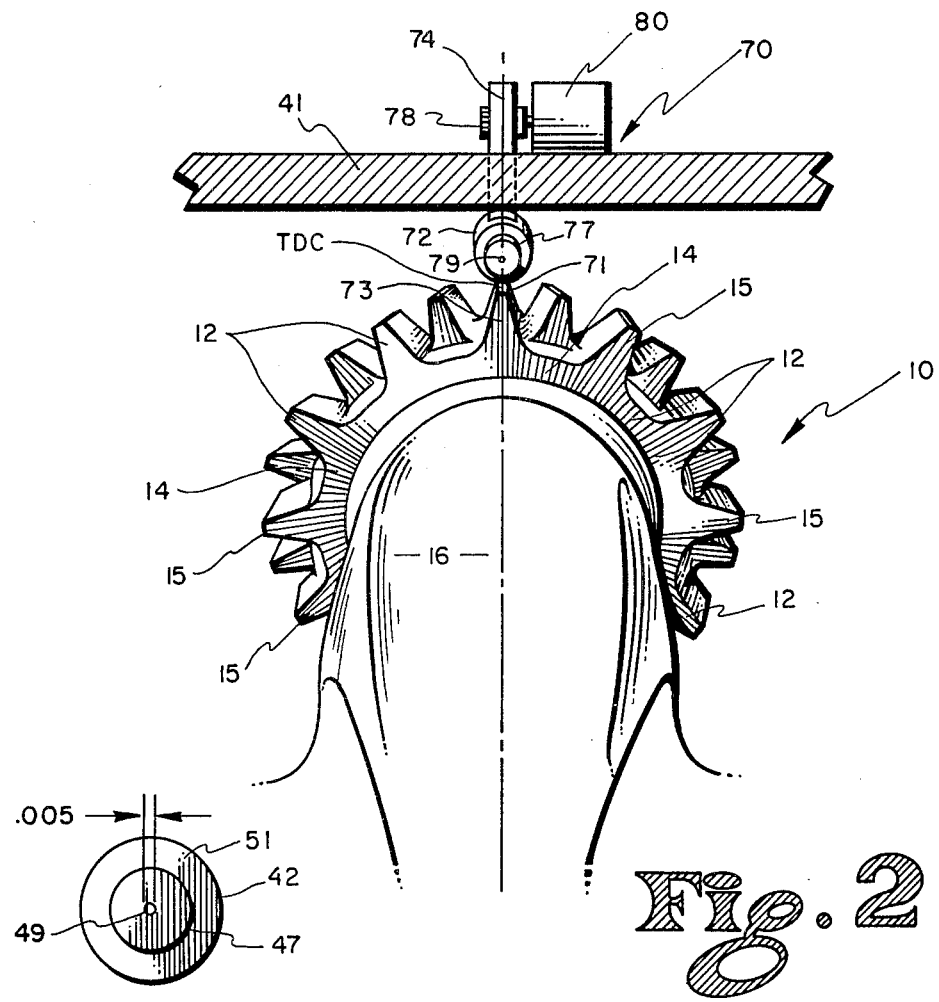
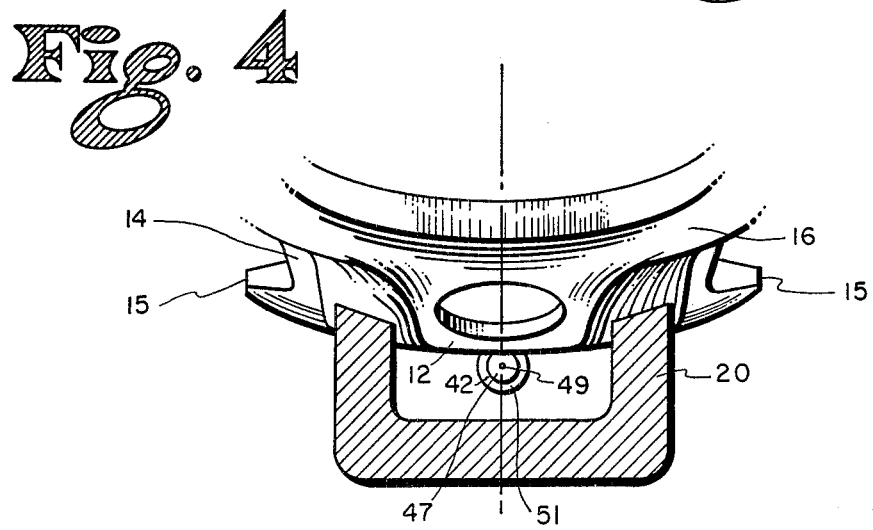
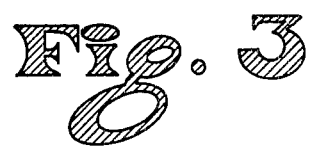

ELECTRONIC MONITORING OF ROCK BIT PARAMETERS

BACKGROUND OF THE INVENTION

1. Field of the Invention

The gage diameter of the rock bit determines the size of the bit and the hole which it drills and is of primary importance in the drilling art.

The gage tolerance standard set by the American Petroleum Institute (API) is the nominal gage to plus 0.031 inch for bit sizes ranging from 3⅝ to 13¾ inches and nominal gage to plus 0.062 inch for bit sizes from 14 to 17½ inches in diameter.

During drilling operations on a drill rig, the drill string is often removed from the hole to change the drill bit type or replace a dull bit. Drill bit cutters, or cones, are designed to maintain the gage diameter even as wear occurs. If the hole diameter is undergage, the following replacement bit will have to ream its way to the hole bottom before starting to drill a new hole. Conversely, the gage of the replacement bit must be within the foregoing tolerance otherwise the new bit, if it is oversize, might not pass down the hole without jamming or causing damage to the well bore. Therefore, the rock bit must be manufactured to exacting standards.

Accordingly, this invention relates to the fabrication process of rock bits with a plurality of rolling cutters wherein the gage diameters must be held within close tolerances.

More specifically, this invention relates to an electronic means to monitor the gage and height of rock bits during the welding process wherein two and three segment rock bits containing individual cones are joined together by metallurgical bonding.

2. Description of Prior Art

Prior art methods to determine the gage of rock bits traditionally utilized go or no-go rings that are slipped over the gage of the rock bit, the bit comprising up to three segments which contain the cones mounted on journals of each of the legs.

For example, U.S. Pat. No. 3,907,191 describes a ring gage which is positioned around the individual leg segments, the individual segments are moved relative to one another causing the parting face of an individual segment to slide against the parting face of an adjacent segment. The segments are moved until the gage cutting surfaces of the segments physically contact a ring gage, thereby insuring that the finished bit will have the desired gage size. These segments are then subsequently welded together over a substantial portion of the parting faces.

This invention is disadvantaged in that the preset mechanical assembly is not monitored during the welding cycle hence the segments could move and any misalignment would not be discovered until the welded assembly is subsequently inspected. A rock bit which is out of gage must be disassembled and rewelded which, of course, is a costly and time consuming process.

The instant invention overcomes this difficulty in that the welding process may be continually monitored by, for example, a non-contacting light beam and light sensitive sensor element. The welding process may then be immediately stopped when an out of gage condition is detected. Adjustments can be made before the weld has gone beyond a point in which the rock bit must be disassembled and rewelded.

An advantage is realized over the prior art in the use of a continuous non-contact measurement system wherein both the gage dimension, bit concentricity and bit height is electronically monitored during the weld process. Radial translation of the bit leg segments to gage is possible using the foregoing systems. True bit geometry is assured by proper journal alignment in the bit carriers when the bit leg segments are initially assembled in a welding fixture.

SUMMARY OF THE INVENTION

It is an object of this invention to provide a non-contact electronic sensing system to monitor rock bit alignment geometry during the rock bit segment welding process.

More particularly, it is an object of this invention to provide a non-contact electronic sensing system to monitor the bit gage, bit concentricity, and bit height for each of the bit thirds in a rotatable weld fixture during the bit welding process.

A method is described which provides precise alignment geometry of a rock bit wherein the gage size, bit concentricity and bit height is determined and monitored during the bit welding process by positioning a first movable electronic sensing system mounted to a housing to a location adjacent the gage of the rock bit, the first sensing system is substantially parallel to the axis of the rock bit.

A second movable electronic sensing system mounted to a housing is positioned in a location adjacent the rock bit, the second system is located substantially normal to the axis of the bit to monitor the height of the bit. The first and second sensing systems are moved into and out of engagement with the rock bit to establish an acceptable range tolerance for the rock bit.

The rock bit mounted to a rotatable weld fixture and spaced from the first and second electronic sensing system is rotated about its axis, the first and second electronic sensing systems continuously monitor the bit gage, bit concentricity and bit height during the welding process.

A beam of light is emitted from a light generator into a light sensing element. The light source is mounted to a fixed structure adjacent a rotatable weld fixture. A rock bit is mounted to the weld fixture by adjustable mounting brackets. Each bit leg segment then slides on an adjacent mating face, the mounting brackets then hold the leg segments to a specific gage dimension. The beam of light parallels the axis of the rock bit and the light sensing element or detector is movable relative to the fixed structure so that the detector may be moved axially inwardly into engagement with the gage surface of the bit. The light sensing detector triggers a go, no-go condition of the gage of a particular leg segment. For example, in a three segment rock bit, as the bit is indexed to each 120° position the non-contacting light sensing system monitors the gage and bit concentricity of each segment.

Another identical light sensing system mounted to the fixed structure is positioned substantially normal to the axis of the rock bit to monitor the height of the rock bit. For example, each cone of a three cone milled tooth rock bit is rotated on its journal until one tooth of the gage row of each cone is positioned to TDC (top dead center). As the weld fixture indexes to the 120° position, each segment is then monitored by the light sensing detector as the detector is moved into and out of engagement with the crown of the TDC tooth thus indicating a go, no-go condition of the bit.

Once the tolerances are established the light sensing system may be set to immediately indicate an out of tolerance condition as the rock bit is being welded. The welding operation could be automatically triggered to the off position so that correction may be made to the bit before the final weld takes place. State of the art methods check tolerances of the bits after the bit is completely welded.

Therefore, an advantage over the prior art is the ability to monitor the gage and height of a rock bit through non-contacting means.

Yet another advantage over the prior art is the means in which the rock bit is monitored during the welding process.

Still another advantage over the prior art is the means in which the bit concentricity is monitored during the welding cycle.

The above noted objects and advantages of the present invention will be more fully understood upon a study of the following detailed description in conjunction with the detailed drawings.

BRIEF DESCRIPTION OF THE DRAWINGS

FIG. 2 is a section taken through 2—2 of FIG. 1 illustrating the height sensing light system beamed across the gage row of milled teeth of a milled tooth rock bit, FIG. 3 is a section taken through 3—3 of FIG. 1 illustrating the gage sensing light generator source beamed through the U-shaped opening in one of the bit weld fixture brackets, and FIG. 4 is a view taken through 4—4 of FIG. 1 illustrating the detector, cap and orifice therein.

Figure 1:
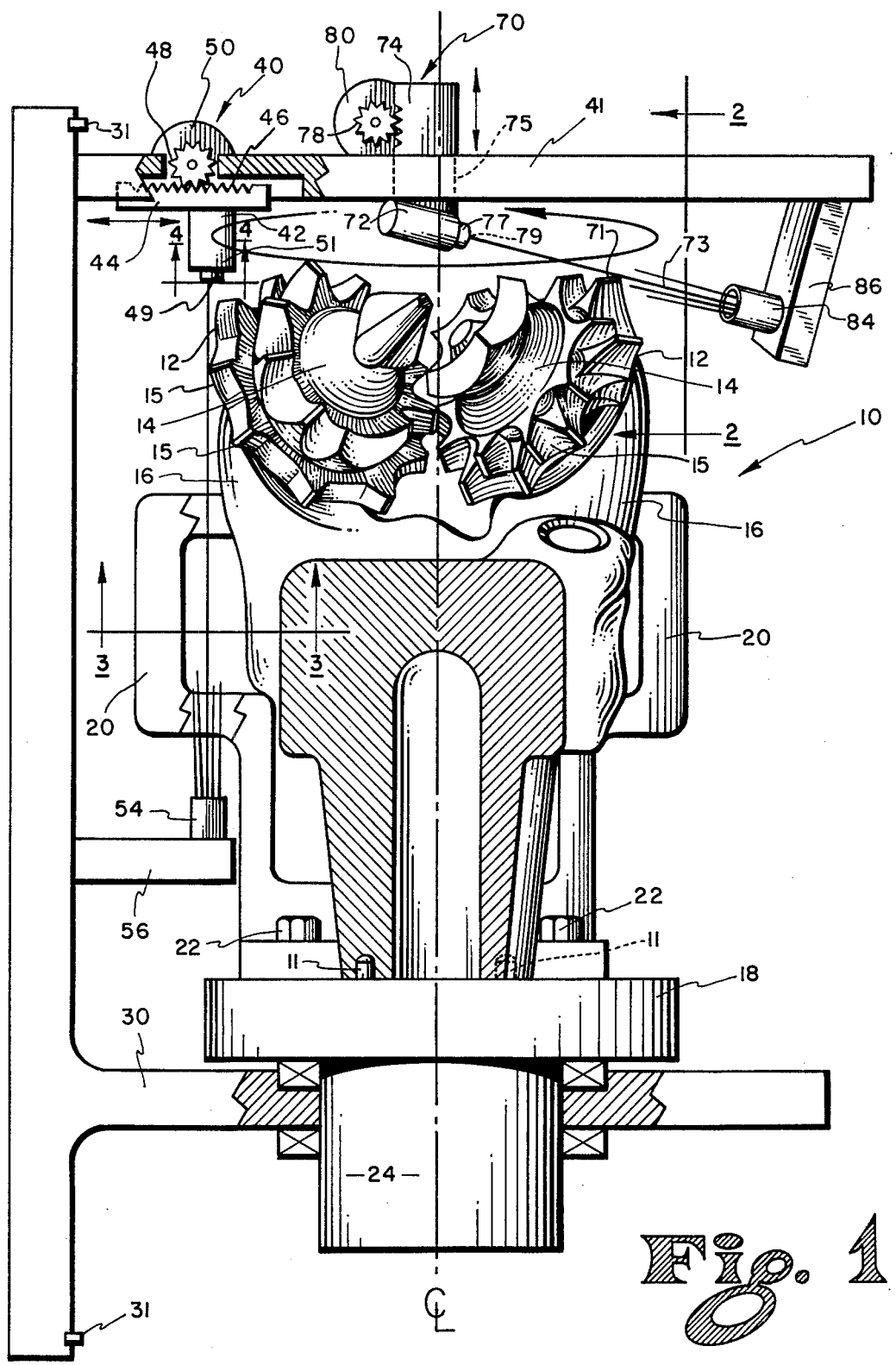
FIG. 1 is a semi-schematic, partially cut away cross section of a light sensitive rock bit monitoring system.

DESCRIPTION OF THE PREFERRED EMBODIMENTS AND BEST MODE FOR CARRYING OUT THE INVENTION

Turning now to FIG. 1, the rock bit generally designated as 10 is mounted to a rotatable weld fixture base 18 by rock bit positioning clamps 20. The clamps 20 are adjustable through bolts 22 which slide within a track at the base of the mounting clamp 20 (not shown). Each segment 16 of the rock bit is held at its base by positioning pin 11. Each individual segment containing a rock bit cone is moved relative to one another causing the parting face of a segment to slide against the parting face of an adjacent segment thus skewing the segments or legs 16 out to the gage dimension. The clamps 20 are then set to hold the individual legs in position during the welding cycle. Each leg 16 contains cones 14 which are mounted to journals machined into the legs (not shown). The rock bit illustrated in FIG. 1, for example, is a three cone milled tooth rock bit. The gage 12 on cones 14 is determined by the outer row of milled teeth 15.

The rock bit, for example, is welded by an electron beam automatic welding machine which requires a near vacuum environment for the welding operation. Thus, the rock bit is contained within a vacuum housing 26 which consists of a wall 28, seals 31, weld fixture support base 30 and base plate 41. Once the vacuum housing containing the rock bit is sealed off within the electron beam welding machine, the welding operation automatically takes place. Motor 24 indexes the weld fixture to each 120° position after each welding operation. As heretofore pointed out, no means has yet been devised to monitor the preset gage and height of the rock bit during the welding process.

A vertical light beam system generally designated as 40 is mounted to base 41 which in turn is affixed to wall 28 of the vacuum housing 26. A light beam receiver or detector, for example, of the type manufactured by Micro Switch of Freeport, Ill., a Division of Honeywell Corporation, (FE-TPC2L light receiver unit) is affixed to a movable light detector base 44, the detector 42, for example, could be moved by a rack and pinion device. Detector 42 consists of a receiver section in housing 51, a cap mask 47 over the receiver "eye" and an orifice 49 defined by the cap. FIG. 4 further illustrates the orifice. An aperture, as small as 0.005 in diameter, will monitor the gage and height of a rock bit within 0.005 of tolerance exceeding the API standards heretofore mentioned. The apertures 49, 79 may be from 0.003 to 0.015. The rack 46 being positioned across the top of base 44 while the pinion gear 48 moves the base 44 in a direction normal to the axis of the rock bit by, for example, a servo motor 50. Of course, the servo motor 50 would be operated at a location remote from the electron beam welder (not shown).

A light beam emitter element 54 (FE-TLS3FR Micro Switch Light Emitter) is affixed to a base 56 which in turn is attached to wall 28 of vacuum chamber 26.

In operation the light detector 42 is first moved to a position which corresponds to the proper gage 12 of rock bit 10. This position may be visually determined by observing a micrometer indicator gage mechanically linked to the detector rack 46 (not shown). The legs 16 are then skewed out to the light beam and locked into position by the clamps 20. The light detector then can be moved into or out of engagement with the gage surface to determine the tolerance range of each leg segment. Once a single leg is set the weld fixture can then be indexed to a 120° position which would correspond to the next leg segment of a three cone rock bit and the procedure is repeated. The gage of the rock bit is thus determined.

The vertical height of each leg 16 of rock bit 10 can also be determined within the same vacuum environment. If each leg of a three cone rock bit, for example, is not equal in length then the cone that protrudes slightly beyond the adjacent cones will be subjected to an unequal pressure. Obviously, the bit will wear prematurely since the cutting surface of the protruding cone, the journal, seals and bearings are deteriorating at a faster rate. Hence, the vertical sensing light system becomes important to assure that the bit legs are of equal lengths.

A substantially horizontal light beam system generally designated as 70 consists of a light detector or receiver 72, a vertical base 74 with rachet surface 76 affixed thereto. Base 74 is driven by pinion gear 78 attached to servo motor 80. The light beam 73 emitting from the light emitter 84 is beamed across the crown 71 of one of the axially extending protrusions on the gage row such as outer row gage teeth 15 of cone 14. The angle of the beam 73 may be varied from 90° to 120° from the axis of the rock bit depending upon the geometry of the outer row gage teeth 15. Of course, the system will work with TCI bits (Tungsten Carbide Inserts) as well as milled tooth rock bits. Each of the cones 14 must be positioned so that one of the outer row gage teeth 15 is located at the TDC of the tooth so that the selected tooth properly intersects at beam 73 of light source 84. Once one of the legs 16 is positioned adjacent the horizontal light beam detector 72, the detector receiver is remotely raised or lowered by servo motor 80 to properly position the detector. The light emitter element 84 is affixed to base 86 which in turn is attached to the base plate 41. The light receiver 72 with orifice defining mask cap 77 in place is moved up and down to pass over to intersect the crown 71 of tooth 15 to establish a tolerance range for each leg 16 of the rock bit 10. Once the detector 72 is set to the desired position dictated by the height tolerance range, the weld fixture 18 is then indexed to the next 120° position to check the next outer gage row of the following cone 14. System 70 may be additionally used to monitor the concentricity of each cone by rotating each cone on its journal as the respective legs are indexed into alignment with system 70.

Once each leg 16 of rock bit 10 is skewed to the proper gage dimension by the vertical light sensing system 40 and the height of each of the legs is checked by the horizontal light sensing system 70, the vacuum housing containing the weld fixture is moved into the electron beam welding machine and the welding process commences. As the welding takes place, systems 40 and 70 monitor the gage and vertical position of each leg segment as it is being welded.

If, for example, one of the legs 16 should for some reason move out of gage the light receiver 42 will sense an interruption of light to the detector and flash a warning to the monitor panel (not shown). The operator could then shut down the welding process so that the problem may be corrected.

FIG. 2 illustrates leg 16 with cone 14 journalled to the leg. This view clearly shows the height monitoring light beam system wherein the light beam 73 crosses crown 71 of the gage tooth row 15. The light detector 72, of course, is positioned by servo mechanism 80. The cone, as stated before, has to be positioned so that one of the gage teeth 15 is at TDC so that each of the legs 16 may be monitored for proper height dimension.

FIG. 3 illustrates the U-shaped clamping mechanism 20 that holds or clamps the rock bit 10 within the indexing weld fixture. The light emitter 54 directs its beam through the space formed by the U, past the gage surface 12 of the cones 14. The light beam detector 42 moves in a radial direction with respect to the axis of the bit to adjust to the correct gage dimension of the rock bit 10.

A light panel, remote from the vacuum housing 26, may contain a series of, for example, red and green indicator lights as an easy reference for the Electron Beam Welding Operator (not shown). The light beam is monitored by the light receiver elements 42 and 72. The indicator lights would remain green when light reaches elements 42, 72 and turn red (a no-go condition) when the sensor detects an interruption of light.

It will, of course, be realized that various modifications can be made in the design and operation of the present invention without departing from the spirit thereof. Thus, while the principal preferred construction, and mode of operation have been explained in what is now considered to represent its best embodiment has been illustrated and described, it should be understood that within the scope of the appended claims the invention may be practiced otherwise than as specifically illustrated and described.

I claim:

1. A method which provides precise alignment geometry of a rock bit wherein the bit size parameters are determined and monitored during the bit welding process comprising the steps of:
   positioning at least one electronic sensing system mounted to a housing adjacent said rock bit,
   rotating said rock bit mounted to a rotatable weld fixture spaced from said at least one electronic sensing system about its axis, and actuating said at least one electronic sensing system to continuously monitor the bit size parameters during said welding process.

2. A method which provides precise alignment geometry of a rock bit wherein the gage size, bit concentricity and bit height is determined and monitored during the bit welding process comprising the steps of:
   positioning a first electronic sensing system mounted to a housing to a location adjacent the gage of said rock bit,
   positioning a second electronic sensing system mounted to a housing to a location adjacent the cutting end of said rock bit,
   rotating said rock bit mounted to a rotatable weld fixture spaced from said first and second electronic sensing system about its axis, and actuating said first and second electronic sensing systems to continuously monitor the bit gage, but concentricity and bit height during said welding process.

3. A method which provides precise alignment geometry of a rock bit wherein the gage size, bit concentricity and bit height is determined and monitored during the bit welding process comprising the steps of:
   positioning a first movable electronic sensing system mounted to a housing to a location adjacent the gage of said rock bit, said first sensing system being substantially parallel to the axis of said rock bit,
   positioning a second movable electronic sensing system mounted to a housing to a location adjacent said rock bit, said second system is located substantially normal to the axis of said bit to monitor the height of said bit,
   moving said first and second sensing system into and out of engagement with said rock bit to establish an acceptable range tolerance for said rock bit,
   rotating said rock bit mounted to a rotatable weld fixture spaced from said first and second electronic sensing system about its axis, and actuating said first and second electronic sensing systems to continuously monitor the bit gage, bit concentricity and bit height during said welding process.

4. The method as set forth in claim 3 further comprising the step of positioning said second electronic sensing system mounted to said housing between 90° and 120° from the axis of said rock bit to monitor the height of said rock bit.

5. A method which provides precise alignment geometry of bit thirds of a rock bit wherein the gage size, bit concentricity and bit third height is determined and monitored during the bit welding process comprising the steps of:
   positioning a first movable electronic sensing system in a location relative to the gage of said rock bit, said first sensing system being substantially parallel to the axis of said rock bit,
   positioning a second movable electronic sensing system mounted to a housing to a location adjacent to said rock bit, said second system is located substantially normal to the axis of said bit to monitor the height of each of said bit thirds, moving said first and second sensing systems into and out of engagement with said rock bit to establish an acceptable range tolerance for said rock bit, rotating said rock bit mounted to a rotatable weld fixture spaced from said first and second electronic sensing systems about its axis, and actuating said first and second electronic sensing systems to continuously monitor the bit gage, bit concentricity and bit thirds height during said welding process.

6. The method as set forth in claims 2, 3, or 5 further comprising the steps of:

rotating a cone journalled to a segment of said rock bit to position one of a multiplicity of cutting protrusions radially extending from the gage row of said cone to top dead center, and positioning said second movable electronic sensing system mounted to said housing adjacent said rock bit, said systems being directed across said cutting protrusion positioned at top dead center to monitor the height of said rock bit.

7. The method as set forth in claim 6 further comprising the step of:

rotating said cone while said second movable electronic sensing system is directed across one of said multiplicity of protrusions to monitor the concentricity of said cone.

8. An apparatus which provides alignment geometry of a rock bit wherein the gage size, bit concentricity and bit height is determined and monitored during the bit welding process comprising:

A rotatable weld fixture having means to mount said rock bit, a fixed housing adjacent said rotatable weld fixture, a first movable electronic sensing system, mounted to said fixed housing, said first sensing system is positioned substantially parallel to the axis of said rotatable weld fixture to be near the gage surface of said bit, a second movable electronic sensing system connected to said fixed housing, said second sensing system is positioned substantially normal to the axis of said rotatable weld fixture near the gage row of one or more cones of said rock bit, means to move said first and second sensing systems to establish a range of tolerance for said rock bit, and means to rotate said rotatable weld fixture about its axis, said first and second electronic sensing systems continuously monitor the bit gage, bit concentricity and bit height during said welding process.

9. The apparatus as set forth in claim 8 wherein said first and second electronic sensing system is a light sensitive system.

10. The apparatus as set forth in claim 9 wherein said light sensitive system comprises a light emitter and a light detector.

11. The apparatus as set forth in claim 10 wherein said light detector further comprises a cap-mask, said cap defining an orifice ranging from 0.003 to 0.015, said cap being attached to the receiver end of said light detector, said orifice defining cap-mask permits a narrow beam of light to contact said light detector, the smaller the orifice, the more precise the measurement of said rock bit parameters.

12. The invention as set forth in claim 11 wherein said cap-mask defines an orifice of 0.005.

13. An apparatus which provides alignment geometry of a rock bit wherein the gage size, bit concentricity and bit height is determined and monitored during the bit welding process comprising:

a rotatable weld fixture having means to mount said rock bit, a fixed housing adjacent said rotatable weld fixture, a first movable light receiver detector mounted to said fixed housing, said detector is positioned to receive a narrow beam of light directed substantially parallel to the axis of said rock bit near the gage surface of said bit, a second light emitter connected to said fixed housing, said emitter directs light past said gage towards said first light detector, a third movable light receiver detector mounted to said fixed housing, said detector is positioned to receive a narrow beam of light directed between 90° and 120° from the axis of said rock bit near the gage row of at least one cone journalled to a segment of said rock bit, a fourth light emitter connected to said fixed housing, said emitter directs light past said gage row of said at least one cone towards said third light detector, means to move said first and third light receiver detectors to establish a range tolerance for said bit gage and bit height, and means to rotate said rotatable weld fixture about its axis, said first and third detectors continuously monitor the bit gage, bit concentricity and bit height during said welding process.

14. The apparatus as set forth in claim 13 further comprising:

means to rotate said at least one cone journalled to said segment of said rock bit to position one of a multiplicity of radially extending protrusions of said gage row to top dead center, said narrow beam of light being directed across the top of said protrusion to determine the height of said rock bit.

15. The apparatus as set forth in claim 14 further comprising means to rotate said at least one cone of said rock bit to determine the cone concentricity of said rock bit.

16. The apparatus as set forth in claim 13 wherein said multiplicity of radially extending protrusions of said gage row of said at least one cone are milled teeth of a milled tooth rock bit, wherein said light beam from said fourth light emitter is directed across the top dead center crown of one of said milled teeth.

17. The apparatus as set forth in claim 13 wherein said multiplicity of radially extending protrusions of said gage row of said at least one cone are tungsten carbide inserts of a TCI rock bit, wherein said light beam from said fourth light emitter is directed across the top dead center apex of one of said tungsten carbide inserts.

* * * * *

UNITED STATES PATENT AND TRADEMARK OFFICE
CERTIFICATE OF CORRECTION

PATENT NO. : 4,210,270
DATED : July 1, 1980
INVENTOR(S) : Lloyd L. Garner

It is certified that error appears in the above–identified patent and that said Letters Patent are hereby corrected as shown below:

Column 6, Claim 1, line 28, after "gage" and before "concentricity", change the word "but" to ---bit---.

Signed and Sealed this

Eighteenth Day of November 1980

[SEAL]

Attest:

SIDNEY A. DIAMOND

Attesting Officer     Commissioner of Patents and Trademarks